United States Patent [19]

Winterhager et al.

[11] 4,029,302

[45] June 14, 1977

[54] DEVICE FOR SEPARATION OF MIXTURES OF AT LEAST PARTIALLY MOLTEN METALS AND/OR METALLIC COMPOUNDS INTO AT LEAST TWO PHASES OF DIFFERENT DENSITY

[75] Inventors: Helmut Winterhager, Aachen; Roland Kammel, Berlin; Michael Lucke, Witten, all of Germany

[73] Assignee: Kloeckner-Humboldt-Deutz AG, Germany

[22] Filed: June 6, 1974

[21] Appl. No.: 476,799

[52] U.S. Cl. .............................. 266/204; 233/1 E; 233/28
[51] Int. Cl.² .......................................... C22B 9/02
[58] Field of Search ............ 233/1 E, 23 R, 27, 28, 233/38, 40, 46; 75/93 R; 266/34 R, 37, 204

[56] References Cited

UNITED STATES PATENTS

| 426,275 | 4/1890 | Hult et al. | 233/23 R |
|---|---|---|---|
| 574,439 | 1/1897 | Mays | 266/204 |
| 957,478 | 5/1910 | Simpson | 233/28 |
| 1,686,912 | 10/1928 | Glessner | 266/10 |
| 2,395,286 | 2/1946 | Merle | 233/27 |
| 3,756,806 | 9/1973 | Hathorn | 75/93 R |

FOREIGN PATENTS OR APPLICATIONS 80,041   4/1894   Germany

Primary Examiner—Roy Lake
Assistant Examiner—Paul A. Bell
Attorney, Agent, or Firm—Hill, Gross, Simpson, Van Santen, Steadman, Chiara & Simpson

[57] ABSTRACT

A device is provided for separating, or dividing, mixtures of at least partially molten metals and/or metal compounds into at least two phases of different density. Said device comprises a centrifugal drum having supply means for the molten mixture in one end wall of the drum and at least one outlet opening for each of said phases in the region of the opposite end wall of the drum, the outlet opening, or openings, for a phase of greater density being disposed at a greater distance from the axis of rotation of the drum than the outlet opening, or openings, for a phase of less density.

5 Claims, 1 Drawing Figure

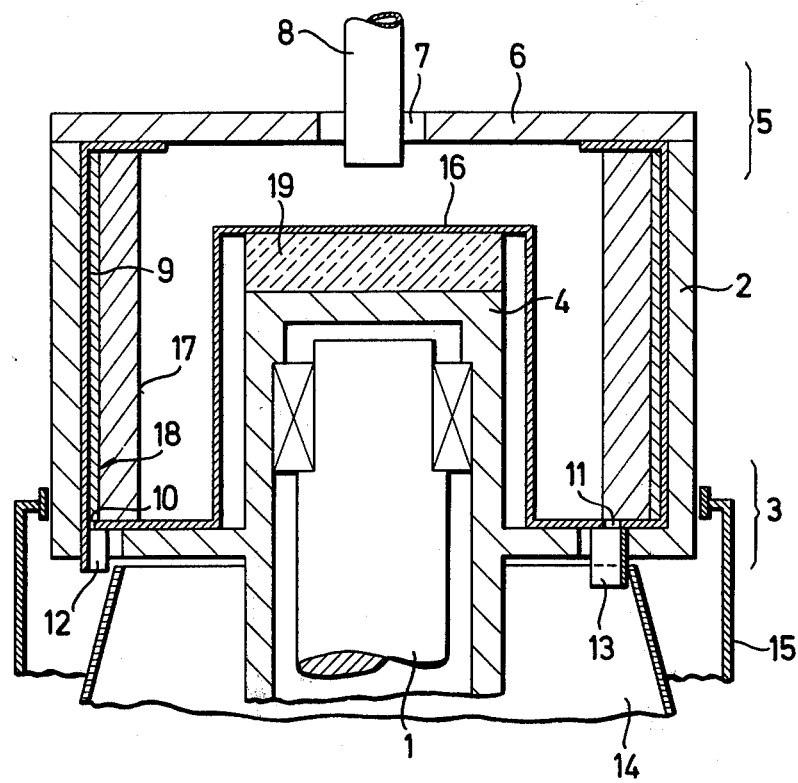

DEVICE FOR SEPARATION OF MIXTURES OF AT LEAST PARTIALLY MOLTEN METALS AND/OR METALLIC COMPOUNDS INTO AT LEAST TWO PHASES OF DIFFERENT DENSITY

This invention relates to a device for separation of mixtures of at least partially molten metals and/or metal compounds into at least two phases of different density, said device comprising a centrifugal drum, a supply means for the molten charge material and withdrawal means for the individual phases.

From the German Pat. No. 80,041 the principle of dividing mixtures of molten metals and/or metal compounds into two phases of different density with the aid of the centrifugal force is already known. The device described in said patent functions in such a manner that the influent material is supplied to the interior side wall of a centrifugal container from which the molten phase of greater density as well as that of less density are withdrawn in a practically radial direction, the inlet openings to the individual withdrawal channels for the phases to be separated being arranged at radially different distances within the container. An essential disadvantage of said known device is that both the supply place for the charge material and at least the outlet opening for withdrawal of the molten phase of the lower density are disposed in immediate vicinity of each other within the container. For instance, in the separation of metallurgical slags which contain metallic globules in finely dispersed form, the result is detrimentally affected to a considerable degree by the fact that the finer metallic globules at the relatively high viscosity of the slag due to the great depth of the bath inherent in the construction do not have sufficient time to settle out under the influence of the centrifugal forces but to a great extent are discharged with the slag to be separated out. It is the object of this invention to provide a device which ensures a substantially superior separation result and is improved and simplified in a structural respect as compared to the known device.

Said object is according to the invention achieved by arranging the supply means to open into one end of the centrifugal drum, while at least one outlet opening for the individual phases to be separated is disposed in the region of the other end of the centrifugal drum, the outlet opening for the phase having the greatest density being disposed at a greater distance from the axis of rotation than the outlet opening for the other phase ($n$). The advantage of the inventive device is that the charge material under the influence of the centrifugal force is retained as a comparatively thin layer on the side wall of the centrifugal drum. Since the supply place is spatially distinctly separated from the outlet location for the individual phases, the result is a greater distance for the phase separation, according to the length of the drum, so that a cleaner separation is ensured even in the case of a fine particle dispersion of components of greater density in the charge material. With suitable adjustment of the passage velocity of the charge material in the axial direction through the centrifugal drum there is sufficient time available for the separation, so that at the outlet end the individual phases in dependence upon composition are clearly separated, for example into metal and slag. At the least, the result is a slag phase with a high concentration of metal and a practically de-metalized slag phase. Economically advantageous separation results are hereby obtained even if the phase with the lower density has a comparatively high viscosity.

In developing the invention it is provided that the outlet opening for the denser phase is arranged in immediate vicinity of the side wall of the centrifugal drum, more specifically in the extension of said side wall. Such a design has the advantage that the centrifugal drum in case of operational distrubances or disruptions can be rotated to complete emptiness, thereby avoiding that greater amounts of the original molten charge material or the individual phases solidify in the drum itself. In the case of a plurality of outlet openings for each of the individual phases it is of advantage to arrange the same uniformly distributed along the circumference of the drum or the end wall, respectively.

In implementation of the invention it is further provided that the total area of the outlet openings for the phase of greater density is less than the combined area of the outlet openings for the phase of less density. Through such an arrangement regulation of the setting of the separation line between the denser and the less dense phases is in a simple way feasible simply by regulation of the quantity of material supplied. It is according to the invention particularly advantageous to make the relation between the total area of the outlet openings for the phase of greater density and the corresponding area of the outlet openings for the phase of less density such as to approximately correspond to the relation between the quantities (amounts) of the individual phases to be expected per unit of time.

In the implementation of the invention it is further provided that the influent device opens axially into the supply end of the centrifugal drum, preferably in the form of a tube or pipe, and that in the region of the inlet opening a deflection means is disposed which deflects the molten charge material toward the side wall of the drum, whereby the desired supplying of the material to said side wall is achieved and the entire traveling distance along said side wall is available. Additionally, it is achieved that due to the deflection in a radial direction the charge material penetrates relatively deeply into the bath already established on the drum side wall and thus in short time is subjected to an acceleration up to the circumferential speed. In a preferred embodiment of the invention it is further provided that the deflecting means is in the form of a rotating deflector disc, whereby the charge material already in the inlet region is subjected to a pre-acceleration which favorably influences the separation result.

In an advantageous embodiment of the invention, particularly in a device with a vertical axis of rotation, it is also provided that in the centrifugal drum a concentric support body extends at a radial distance from the inside of the drum from the outlet end thereof to the region of the inlet end with the end of said support body facing the inlet opening preferably constituting said deflector device. A device of this kind can even in the case of larger dimensions be journaled in an overhung manner which renders it feasible to dispose the bearing in the vicinity of the plane of the center of gravity. In the case of larger units it is even feasible to provide the bearing within the support body, so that centrifugal drums of comparatively great length also become structurally possible. An additional advantage is also obtained hereby, in that the interior of the drum through the provision of a suitably removable cover in the region of the inlet end becomes readily accessible without extensive dismantling measures.

In an advantageous embodiment the interior wall of the drum is at least partially provided with a preferably heat insulating lining, those surfaces of the lining or the drum wall which come in contact with the molten material, comprising a preferably in one piece made and removable covering of a heat and corrosion resistant material. The advantage of such an arrangement consists in the fact that the centrifugal drum may be produced by a composite method of construction, i.e. that for the lining which for example may consist of sheet metal, a material may be used which is heat and corrosion resistant in order to sustain the attacks by the molten charge material. As a rule such materials do not, however, at the temperatures of more that 1000° C here in question possess the high mechanical properties of strength required for a centrifugal drum with rotary velocities of 8 meters per second and more.

Another advantage of such an arrangement is that the operation and supervision are simplified and the operational safety is enhanced. It is, for example, feasible after removal of a suitable cover in the region of the inlet end to take out the lining while it is still hot and then to remove deposits and the like through quenching. On the other hand, the starting of such a device is considerably simplified since the lining may be stationarily preheated in a furnace and inserted in hot condition in the centrifugal drum so that upon closing of the cover the drum can immediately be put into operation.

According to a further embodiment of the invention it is therefore of advantage to fixedly connect the, for example, nozzle-shaped outlet openings for the individual phases to be separated with the lining, so that through exchange of said lining also linings with different area relations of the outlet openings can be inserted, whereby in a short time the device can be accommodated to changing operational conditions or changing composition of the charge material.

An embodiment of the invention is described with reference to the accompanying drawing in which on a bearing pin 1 which forms part of a support structure (not shown), a centrifugal drum 2 is mounted for rotation about a vertical axis and connected with suitable driving means. In this embodiment the centrifugal drum is so constructed that from the outlet end region 3 a concentric support body 4 extends at a radial distance from the inside of the drum into the charge end region 5. Through said support body the centrifugal drum is, on one hand, connected with the driving means and, on the other hand, rotatably journalled on the bearing pin 1. The necessary cooling of the bearing is not shown in detail in the drawing. The supply end of the drum is provided with a preferably removable cover 6 which at its center is provided with an opening 7 through which a tubular supply means 8 projects into the interior of the drum.

In this embodiment a removable lining 9 of heat and corrosion resistant material is inserted as a covering for the surfaces which may come into contact with the molten material. Said insert is in the example at its lower end, i.e. the outlet end of the drum, preferably provided with a plurality of circumferentially spaced outlet openings 10 for the phase of greater density, said outlet openings being arranged in the end wall in the extension of the side wall of the drum. At a smaller distance from the axis of rotation than the openings 10 there are outlet openings 11 in the end wall of the insert 9, said last mentioned outlet openings 11 serving for the discharge of the phase of the mixture having less density. It is advantageous to make the lining or insert of a heat resistant cobalt-chromium-iron alloy, such as UMCo 50 (50% cobalt, 27% chromium and 23% iron).

According to the invention there is in the region of the outlet openings 10 and 11 and with regard to the axis of rotation in the area of the outer edges of said openings in each instance provided a guide plate 12, 13. By means of said guide plate the separated phase passing through the openings is transmitted to the respective collection housing. An essential advantage of such an arrangement consists in the fact that deposits can be formed only in the outlet passages themselves. However, since said passages have only a short length, there is practically no risk that the openings will be clogged shut, since they will be kept open under the influence of the flow. Deposits on the guide plates proper, on the other hand, have practically no effect on the function of the device. Also, due to the short length of the outlet passages, they can at any time be freed from deposits in a simple manner. Preferably the guide plate 13 at the outlet opening 11 for the phase of lower density is surrounded with some spacing by a collar-shaped end piece 14 of a catching and collecting device (not shown). Hereby a clean separation of the phases of different density withdrawn at different distances from the axis of rotation is ensured. For catching the denser phase thrown off the guide plate 12 the lower end portion of the centrifugal drum is provided with a suitable surrounding collection housing 15.

In operation, the centrifugal drum which has been preheated to operational temperature, is set into rotary motion, the rotary speed or circumferential velocity being dependent upon the viscosities of the individual phases or components of the charge material and aiming at an extensive separation of the phase of high density. In the case of the lead containing slag mentioned below a circumferential velocity of about 10 to 12 meters per second is sufficient for obtaining good separation results. The molten charge material to be separated, for example a slag in which metallic lead is dispersed, is through the supply means 8 introduced into the interior of the rotating centrifugal drum. Said molten charge material thereby first impinges upon the end surface 16 of the insert 9 facing the opening in the supply means, said insert 9 rotating at the same circumferential speed as the centrifugal drum and thus forming a rotating deflection disc. Between the end surface of the support body 4 and the deflection disc 16 there is a heat insulating insert 19 for the protection of the bearing that is disposed within the support body. The bearing is through the intermediary of the bearing pin 1 suitably provided with a cooling means (not shown). By the deflection disc the incoming stream of material is deflected in radial direction toward the drum side wall and at the same time accelerated in the circumferential direction, so that the molten material with a pre-velocity in the circumferential direction impinges upon the surface 17 of the "bath" maintained on the side wall of the drum due to centrifugal forces and is there accelerated up to the full rotary speed. Since through the outlet openings a partial quantity of said "bath" is continuously withdrawn, a flow of said "bath" material in the axial direction is produced. Under the influence of the centrifugal force the lead globules dispersed in the slag move due to their higher density simultaneously in the direction towards the side wall of the drum where they in a region behind the inlet end of the drum accumulate in the form of a distinct film or layer.

At least in the area of the outlet end of the centrifugal drum said layer shows a distinct separation surface 18 between the liquid lead and the slag of less density. Through suitable coordination of influent quantity, rotational speed and the relation between the outlet areas of the openings 10 and 11, an equilibrium condition can be achieved so that said separation surface 18 is maintained at a practically unchanging distance from the axis of rotation, whereby through the opening 10 the metallic lead and through the opening 11 the demetalized slag may be withdrawn.

Since the minute lead globules at least partially are very finely dispersed in the slag so that due to the viscosity of the slag the very smallest globules are not passed outwardly under the influence of the centrifugal force, not even in the case of centrifugal drums of considerable length a complete separation into lead and slag can be obtained in practice. Rather, what is obtained is a phase of greater density slag with a strong concentration of lead and a phase of less density as a slag strongly reduced in lead content or, in other words, a demetalized slag. For example, in the case of a metallurgical slag containing metallic lead in finely dispersed form in the amount of 2.37% by weight there was at a circumferential velocity of about 12 meters per second obtained a reduction of the lead content to about 0.3% by weight, i.e. the lead content was practically completely recovered. Fundamentally, the designing of the device for specific cases of use is to be based upon the fact that in the case of small difference in the weight the length of the drum and/or the diameter of the drum, i.e. the circumferential speed, must be greater than in the case of great differences in weight between the phases to be separated.

The invention is not to be considered limited to the above example, neither with regard to structure, nor in respect of utilization. For example, it is for the separation of molten mixtures with only a small proportion of denser phase in the less dense phase of advantage to provide instead of a cylindrical centrifugal drum a drum which gradually increases in diameter towards the outlet end or, alternatively, to insert in a cylindrical centrifugal drum a suitable insert of such configuration made of heat and corrosion resistant material. Under certain circumstances it is sufficient to provide a conical widening in the region of the outlet end, whereby even with small quantities of the phase of greater density it is possible to form a sufficiently deep "bath" immediately in front of the outlet openings so that a stable condition and thereby a cleanly separated output of the two phases is ensured.

We claim as our invention:

1. A device for separation of mixtures of at least partially molten metals and/or metal compounds into at least two phases of different density comprising:
    a rotatably mounted centrifugal drum having two opposite end walls and a connecting side wall;
    supply means for said mixture in one of said end walls;
    a first outlet opening of a predetermined limited size for a first phase of greater density and a second outlet opening of a predetermined limited size for a second phase of less density each opening being in the other end wall, the first outlet opening being disposed at a greater distance from the axis of rotation of the drum than the second outlet opening, said outlet openings being of short axial length;
    first and second axially extending guide plates for said first and second outlet openings respectively, said plates positioned in the area of the outer edge of the openings with respect to the axis of rotation and configured so that deposits on the guide plates cannot stop the flow through the openings; and
    first and second annular stationary collection housings positioned with said guide plates extending axially beyond the edges of the housings so that said phases will enter said collection housings.

2. A device according to claim 1, in which the centrifugal drum preferably has a vertical axis of rotation and said other end wall of the drum is provided with a support body which is concentric with the drum and extends inwardly from said other end wall at a radial distance from the side wall of the drum to the vicinity of said supply means, the end of said support body facing said supply means being in the form of a deflection device.

3. A device according to claim 1, in which the centrifugal drum is provided on at least a portion of the inside of said side wall with a heat insulating releasable lining covering at least those portions of said side wall which come in contact with such mixtures, said lining being comprised of onepiece of a heat and corrosion resistant material.

4. A device according to claim 1, in which said lining comprises a heat resistant cobalt-chromium-iron alloy.

5. A device for separating mixtures of partially molten metals or metal compounds into at least two phases of different density constructed in accordance with claim 1:
    wherein the total cross-sectional area of the first outlet opening is less than the total cross-sectional area of the second outlet opening and the first and second openings are of a size to correspond to the output quantity of the respective first and second phases discharged through said openings in a unit of time from said drum.

* * * * *